(12) United States Patent
Kiss et al.

(10) Patent No.: US 11,189,277 B2
(45) Date of Patent: Nov. 30, 2021

(54) DYNAMIC GAZETTEERS FOR PERSONALIZED ENTITY RECOGNITION

(71) Applicant: Amazon Technologies, Inc., Seattle, WA (US)

(72) Inventors: Imre Attila Kiss, Arlington, VA (US); Arthur Richard Toth, Somerville, MA (US); Lambert Mathias, Arlington, VA (US)

(73) Assignee: Amazon Technologies, Inc., Seattle, WA (US)

( * ) Notice: Subject to any disclaimer, the term of this patent is extended or adjusted under 35 U.S.C. 154(b) by 138 days.

(21) Appl. No.: 16/275,074

(22) Filed: Feb. 13, 2019

(65) Prior Publication Data

US 2019/0318737 A1    Oct. 17, 2019

Related U.S. Application Data

(63) Continuation of application No. 13/828,063, filed on Mar. 14, 2013, now Pat. No. 10,224,030.

(51) Int. Cl.
| | |
|---|---|
| *G10L 15/22* | (2006.01) |
| *G10L 17/00* | (2013.01) |
| *G06F 40/284* | (2020.01) |
| *G10L 15/26* | (2006.01) |
| *G06F 40/295* | (2020.01) |

(52) U.S. Cl.
CPC ............ *G10L 15/22* (2013.01); *G06F 40/284* (2020.01); *G06F 40/295* (2020.01); *G10L 15/26* (2013.01); *G10L 17/00* (2013.01); *G10L 2015/223* (2013.01); *G10L 2015/227* (2013.01)

(58) Field of Classification Search
CPC ......... G10L 17/00; G10L 17/04; G10L 17/12; G10L 15/22; G10L 15/26; G10L 2015/227; G10L 2015/223; G06F 40/284; G06F 40/295
See application file for complete search history.

(56) References Cited

U.S. PATENT DOCUMENTS

| | | | | |
|---|---|---|---|---|
| 5,144,672 | A * | 9/1992 | Kuriki | G10L 15/063 704/252 |
| 5,579,436 | A * | 11/1996 | Chou | G10L 15/063 704/236 |
| 5,737,487 | A * | 4/1998 | Bellegarda | G10L 15/065 704/231 |
| 5,799,276 | A * | 8/1998 | Komissarchik | G10L 15/04 704/207 |
| 6,542,866 | B1 * | 4/2003 | Jiang | G10L 15/02 704/240 |

(Continued)

*Primary Examiner* — Michael N Opsasnick
(74) *Attorney, Agent, or Firm* — Pierce Atwood LLP

(57) ABSTRACT

In speech processing systems personalization is added in the Natural Language Understanding (NLU) processor by incorporating external knowledge sources of user information to improve entity recognition performance of the speech processing system. Personalization in the NLU is effected by incorporating one or more dictionaries of entries, or gazetteers, with information personal to a respective user, that provide the user's information to permit disambiguation of semantic interpretation for input utterances to improve quality of speech processing results.

23 Claims, 9 Drawing Sheets

(56) References Cited

U.S. PATENT DOCUMENTS

| | | | | |
|---|---|---|---|---|
| 6,542,869 B1* | 4/2003 | Foote | ............... | G10H 1/00 |
| | | | | 704/500 |
| 2008/0090513 A1* | 4/2008 | Collins | ............ | G06Q 30/0251 |
| | | | | 455/3.01 |
| 2008/0288252 A1* | 11/2008 | Cerra | ............... | G10L 15/30 |
| | | | | 704/244 |
| 2009/0258333 A1* | 10/2009 | Yu | ............... | G09B 19/06 |
| | | | | 434/157 |
| 2012/0016678 A1* | 1/2012 | Gruber | ............ | G06F 16/3329 |
| | | | | 704/275 |
| 2012/0265528 A1* | 10/2012 | Gruber | ............ | G10L 15/183 |
| | | | | 704/235 |
| 2014/0297252 A1* | 10/2014 | Prasad | ............ | G10L 15/01 |
| | | | | 704/2 |

* cited by examiner

DYNAMIC GAZETTEERS FOR PERSONALIZED ENTITY RECOGNITION

CROSS-REFERENCE TO RELATED APPLICATION

This application is a continuation of, and claims the benefit of priority of, U.S. Non-provisional patent application Ser. No. 13/828,063, filed on Mar. 14, 2013, and entitled "DYNAMIC GAZETTEERS FOR PERSONALIZED ENTITY RECOGNITION," scheduled to issue on Mar. 5, 2019 as U.S. Pat. No. 10,224,030, the contents of which is expressly incorporated herein by reference in its entirety.

BACKGROUND

Human-computer interactions have progressed to the point where humans can control computing devices, and provide input to those devices, by speaking. Computing devices employ techniques to identify the words spoken by a human user based on the various qualities of a received audio input. Such techniques are called speech recognition or automatic speech recognition (ASR). Speech recognition combined with natural language processing or Natural Language Understanding (NLU) techniques may allow a user to control a computing device to perform tasks based on the user's spoken commands. The combination of such techniques may be referred to as speech processing. Speech processing may also convert a user's speech into text data which may then be provided to various textual based programs and applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

A spoken command from one user into a device may mean something different when the exact same command is spoken by a different user. For example, one user speaking the command "play some stones" may desire a device to activate a music player and play a Rolling Stones song from the user's music collection stored in his device. A second user speaking the command "play some stones" may desire a device to activate a video game application entitled "Stones" that is stored on her device. As such, in certain situations personalized speech processing may be desired.

Speech processing systems may have improved quality of results by incorporating a capability to better discriminate the source/content of speech. Because the same input utterance may result in different semantic interpretations depending on the given user, offered is a system and method for adding personalization in the Natural Language Understanding (NLU) process by incorporating external knowledge sources of information about the user. The user information may include personal information about the user (including the user's name, age, gender, etc.), information related to the user's behavior (such as frequently visited locations, place of employment, music catalog, favorite TV shows, and the like), or any other information related to a specific user or potential user of a device. Incorporating this type of user information may improve natural language understanding. Personalization in the NLU is effected by incorporating one or more dictionaries of entries, or gazetteers, which include indications that certain categories of facts that may impact speech processing (called features) are or are not applicable to the particular user of the device. The user features indicated by the gazetteers may then alter how the NLU process is performed and may remove ambiguities in the semantic interpretation of input utterances as explained below, thereby improving the quality of speech processing results.

Figure 1:
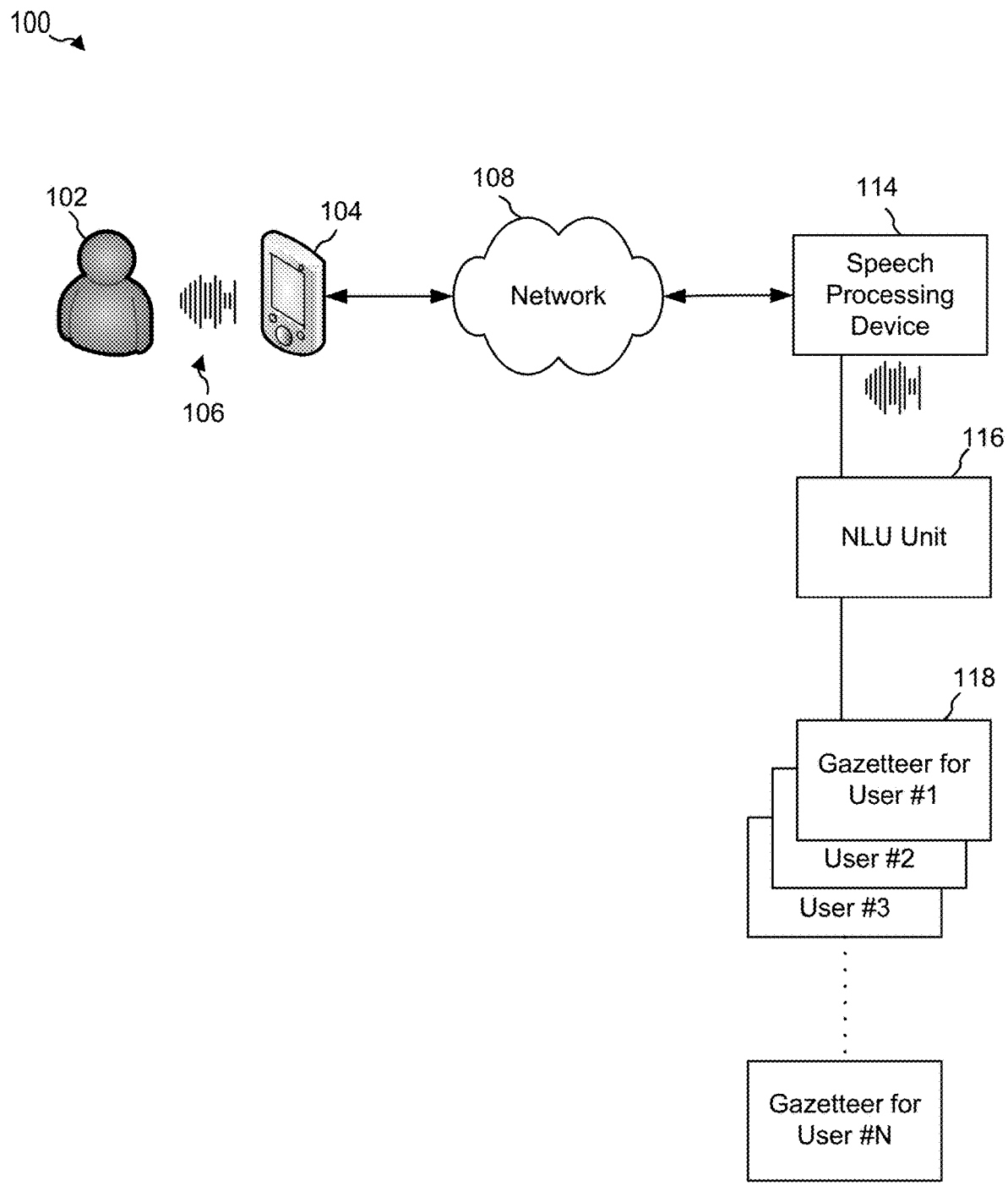
FIG. 1 is a block diagram of a speech processing system with personalized entity recognition information implemented in a gazetteer available to a Natural Language Understanding (NLU) unit according to one aspect of the present disclosure.

FIG. 1 shows a speech processing system for processing speech with improved semantic understanding by incorporating personalized gazetteers according to one aspect of the present disclosure. The user 102 inputs a spoken audio command 106 to local device 104. The device 104 then processes the spoken audio 106 and sends a version of the spoken audio 106 over a network 108 to a remote speech processing device 114, where the spoken audio 106 is stored and processed. Although the system illustrated in FIG. 1 is a distributed speech processing system, the teachings herein may apply to any combination of speech processing systems including distributed systems, localized systems, etc. After the audio is converted to text, the local device or remote device performs natural language understanding on the text, via a NLU unit 116.

As described in more detail below, the NLU unit 116 determines the meaning behind the text based on the individual words and may then execute a command based on that meaning or pass the semantic interpretation to another module for implementation. As illustrated, a gazetteer 118 created from a user's information is made available to the NLU unit 116 during runtime. This gazetteer may indicate to the NLU various features that may be relevant to the NLU unit 116 such as the user's location, the user's music catalog, etc. For example, if the spoken audio command 106 is "play some stones" the NLU unit 116 may be more likely to interpret the command one way or the other if it knows that the user has some Rolling Stones music in his/her music catalog or if the user's device stores a video game application entitled "Stones."

Figure 2:
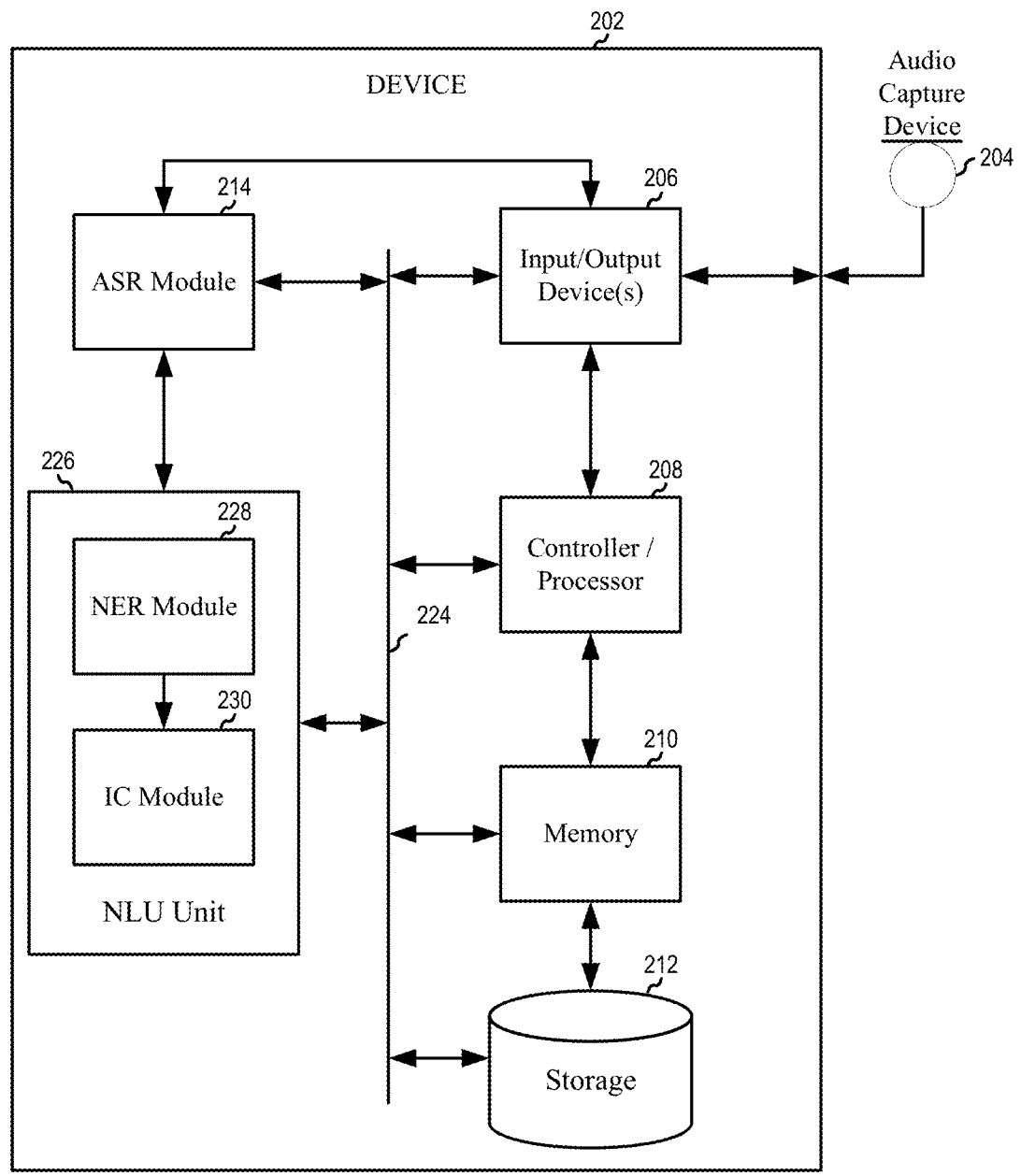
FIG. 2 is a block diagram conceptually illustrating a device for speech processing according to one aspect of the present disclosure.

FIG. 2 shows a speech processing device 202 for performing speech recognition. Aspects of the present disclosure include computer-readable and computer-executable instructions that may reside on the device 202. FIG. 2 illustrates a number of components that may be included in the device 202, however other non-illustrated components may also be included. Also, some of the illustrated components may not be present in every device capable of employing aspects of the present disclosure. Further, some components that are illustrated in the device 202 as a single component may also appear multiple times in a single device. For example, the device 202 may include multiple input/output devices 206 or multiple controllers/processors 208.

Multiple devices may be employed in a single speech processing system. In such a multi-device system, the devices may include different components for performing different aspects of the speech processing. The multiple devices may include overlapping components. The device as illustrated in FIG. 2 is exemplary, and may be a stand-alone device or may be included, in whole or in part, as a component of a larger device or system.

The teachings of the present disclosure may be applied within a number of different devices and computer systems, including, for example, general-purpose computing systems, server-client computing systems, mainframe computing systems, telephone computing systems, laptop computers, cellular phones, personal digital assistants (PDAs), tablet computers, other mobile devices, etc. The device 202 may also be a component of other devices or systems that may provide speech processing functionality such as automated teller machines (ATMs), kiosks, home appliances (such as refrigerators, ovens, etc.), vehicles (such as cars, buses, motorcycles, etc.), and/or exercise equipment, for example.

As illustrated in FIG. 2, the device 202 may include an audio capture device 204 for capturing spoken utterances for processing. The audio capture device 204 may include a microphone or other suitable component for capturing sound. The audio capture device 204 may be integrated into or may be separate from the device 202. The device 202 may also include an address/data bus 224 for conveying data among components of the device 202. Each component within the device 202 may also be directly connected to other components in addition to (or instead of) being connected to other components across the bus 224. Although certain components are illustrated in FIG. 2 as directly connected, these connections are illustrative only and other components may be directly connected to each other (such as the ASR module 214 to the controller/processor 208 and/or the NLU unit 226).

The device 202 may include a controller/processor 208 that may be a central processing unit (CPU) for processing data and computer-readable instructions and a memory 210 for storing data and instructions. The memory 210 may include volatile random access memory (RAM), non-volatile read only memory (ROM), and/or other types of memory. The device 202 may also include a data storage component 212, for storing data and instructions. The data storage component 212 may include one or more storage types such as magnetic storage, optical storage, solid-state storage, etc. The device 202 may also be connected to removable or external memory and/or storage (such as a removable memory card, memory key drive, networked storage, etc.) through the input/output device 206. Computer instructions for processing by the controller/processor 208 for operating the device 202 and its various components in accordance with the present disclosure may be executed by the controller/processor 208 and stored in the memory 210, storage 212, external device, or in memory/storage included in the ASR module 214 discussed below. Alternatively, some or all of the executable instructions may be embedded in hardware or firmware in addition to or instead of software. The teachings of this disclosure may be implemented in various combinations of software, firmware, and/or hardware, for example.

A variety of input/output device(s) 206 may be included in the device. Example input devices include an audio capture device 204, such as a microphone (pictured as a separate component), a touch input device, keyboard, mouse, stylus or other input device. Example output devices include a visual display, tactile display, audio speakers, headphones, printer or other output device. The input/output device 206 may also include an interface for an external peripheral device connection such as universal serial bus (USB), FireWire, Thunderbolt or other connection protocol. The input/output device 206 may also include a network connection such as an Ethernet port, modem, etc. The input/output device 206 may also include a wireless communication device, such as radio frequency (RF), infrared, Bluetooth, wireless local area network (WLAN) (such as WiFi), or wireless network radio, such as a radio capable of communication with a wireless communication network such as a Long Term Evolution (LTE) network, WiMAX network, 3G network, etc. Through the input/output device 206 the device 202 may connect to a network, such as the Internet or private network, which may include a distributed computing environment.

The device may also include an automatic speech recognition (ASR) module 214 for processing spoken audio data into text. The ASR module 214 transcribes audio data into text data representing the words of the speech contained in the audio data. The text data may then be used by other components for various purposes, such as executing system commands, inputting data, etc. Audio data including spoken utterances may be processed in real time or may be saved and processed at a later time. A spoken utterance in the audio data is input to the ASR module 214 which then interprets the utterance based on the similarity between the utterance and models known to the ASR module 214. For example, the ASR module 214 may compare the input audio data with models for sounds (e.g., subword units or phonemes) and sequences of sounds to identify words that match the sequence of sounds spoken in the utterance of the audio data. The different ways a spoken utterance may be interpreted may each be assigned a probability or a recognition score representing the likelihood that a particular set of words matches those spoken in the utterance. The recognition score may be based on a number of factors including, for example, the similarity of the sound in the utterance to models for language sounds (e.g., an acoustic model), and the likelihood that a particular word which matches the sounds would be included in the sentence at the specific location (e.g., using a language or grammar model). Based on the considered factors and the assigned recognition score, the ASR module 214 may output the most likely words recognized in the audio data. The ASR module 214 may also output multiple alternative recognized words in the form of a lattice or an N-best list.

The ASR module 214 may be connected to the bus 224, input/output device(s) 206, audio capture device 204, controller/processor 208, NLU unit 226 and/or other component of the device 202. Audio data sent to the ASR module 214 may come from the audio capture device 204 or may be received by the input/output device 206, such as audio data captured by a remote entity and sent to the device 202 over a network. Audio data may be in the form of a digitized representation of an audio waveform of spoken utterances.

The ASR module 214 includes an acoustic front end (AFE), a speech recognition engine, and speech storage. The AFE transforms audio data into data for processing by the speech recognition engine. The speech recognition engine compares the speech recognition data with the acoustic, language, and other data models and information stored in the speech storage for recognizing the speech contained in the original audio data. The AFE and speech recognition engine may include their own controller(s)/processor(s) and memory or they may use the controller/processor 208 and memory 210 of the device 202, for example. Similarly, the instructions for operating the AFE and speech recognition engine may be located within the ASR module 214, within the memory 210 and/or storage 212 of the device 202, or within an external device.

The AFE within the ASR module 214 may divide the digitized audio data into frames, with each frame representing a time interval, for example 10 milliseconds (ms). During that frame the AFE determines a set of values, the feature vector, representing the features/qualities of the utterance portion within the frame. Feature vectors may contain a varying number of values and represent different qualities of the audio data within the frame. Audio qualities of points within a frame may be stored into feature vectors. Feature vectors may be streamed or combined into a matrix that represents a time period of the spoken utterance. These feature vector matrices may then be passed to the speech recognition engine for processing. A number of approaches may be used by the ASR Module 214 and AFE to process the audio data. Such approaches may include using mel-frequency cepstral coefficients (MFCCs), perceptual linear predictive (PLP) techniques, neural network feature vector techniques, linear discriminant analysis, semi-tied covariance matrices, or other approaches known to those of skill in the art.

Processed feature vectors may be output from the ASR module 214 and sent to the input/output device 206 for transmission to another device for further processing. The feature vectors may be encoded and/or compressed prior to transmission.

The speech recognition engine attempts to match received feature vectors to language phonemes and words such as may be known in the storage 212. The speech recognition engine may compute recognition scores for the feature vectors based on acoustic information and language information. The acoustic information may be used to calculate an acoustic score representing a likelihood that the intended sound represented by a group of feature vectors match a language phoneme. The language information may be used to adjust the acoustic score by considering what sounds and/or words are used in context with each other, thereby improving the likelihood that the ASR module outputs speech results that make sense grammatically.

Following ASR processing, the ASR results may be sent by the ASR module 214 to another component of the device 202, such as the controller/processor 208 for further processing (such as execution of a command included in the interpreted text) or to the input/output device 206 for sending to an external device. The ASR module 214 may output processed text or may also output multiple alternative recognized words in the form of a lattice or an N-best list.

ASR results may be sent to a natural language understanding (NLU) unit 226 for further speech processing. The NLU unit may also receive textual input from another source, such as the input/output device 206. The NLU unit 226 may include a dedicated NLU engine, processor, memory, storage, named entity recognition (NER) module 228, intent classification (IC) module 230, and/or other components, and/or may use components otherwise available on the device 202. The NLU unit takes the textual output of ASR processing and attempts to make a semantic interpretation of the ASR result. That is, the NLU unit determines the meaning behind the text based on the individual words and then executes a command based on the meaning or passes a command to a downstream application for execution. The NLU processing is based on the models and programming available to the NLU unit. Such models may be grammar based, rule based, or constructed in a different manner. The NLU unit interprets the text string to derive an intent or a desired action from the user as well as the pertinent pieces of information in the text that may facilitate completion of that action. The NLU may be configured to annotate or label text as part of NLU processing. For example, text may be annotated as a command (to execute) or text may be annotated as a target of the command. To correctly perform NLU processing of speech input the NLU may be configured to communicate with a variety of other components/applications of a device. The NLU may initiate instructions to other components/applications of a device in order to perform actions the NLU believes have been commanded by a user. NLU processing may be performed by a local device or by a remote device. If performed by a remote device, the remote device may then send instructions to a local device to perform operations based on the NLU results.

NER processing involves processing a sequence of words in a textual input, recognizing and identifying specific important words, called named entities, of an NLU textual input and assigning a tag or label to those words, which may be performed by a NER module 228. The tag or label is a classification of the associated word that may assist eventually implementing the user's spoken command. For example, for a command of "play some stones" the word "play" may be associated with a "PlayTrigger" tag and the word "stones" may be associated with an "ArtistName" tag. The word "some" may be considered less important, thus not considered a named entity and may not receive a tag.

As part of determining what (if any) tag to apply to each word, the NER module 228 may consider textual context information, such as what words come before or after the word being processed, what other words appear in the sentence, etc. These factors to consider in processing, called features, are indicated to the NER module 228 through feature vectors. Each word in the sequence of words maps to a feature vector. The feature vector is a long data structure which indicates what circumstances apply to the particular word. For example, a NLU unit 226 may have access to an index of thousands of words that are known to the system. The feature vector may include an entry for all or a subset of the words in the index to indicate whether the selected word of the index is the actual word being processed, whether a word in the index is located in the same sentence as the word being processed, whether a word in the index is directly before or after the word being processed, etc. The information in the feature vector may then influence the NER processing in its attempt to tag the text. For example, if the NER module 228 is processing the word "stones" and it knows that the word directly previous to "stones" is "rolling" it may be more likely to apply the tag "Artist-Name" to the word "stones."

A feature vector may include components that are binary features that may be effectively "yes or no" indicators or may include non-binary values. Other information about the text may also be indicated to the NER module 228 through entries in the feature vector. The individual feature vectors for specific words are typically sparse, meaning that only a small subset of the feature vector entries have a non-zero value. The information represented by the feature vector entries are typically defined when training the models used by the NER module 228. When performing NER, the NER module 228 thus may process the feature vector associated with the word, rather than processing the word itself.

Generally, models used for NER may be trained with feature vectors such as those associated with words during NER processing, with the feature vectors capture the word identity as well as other information that may be pertinent to that word (e.g. contextual and other information as mentioned above). Known models that may be used in NER include maximum entropy models (also known as log-linear models), such as Maximum Entropy Markov Models (MEMMs) or Conditional Random Fields (CRFs). The underlying model may apply weights to certain of the data/feature-components associated with the word and included in the feature vector. The weights may determine the relative importance of each of the feature vector components. Feature vectors weights may be applied during training where the underlying NLU model essentially provides the set of weights that are trained on a certain set of data/words and those weights indicate how important each of those feature vector components are. Thus the NER model internally has weight vectors that have the same dimension as the actual feature vectors and when the NER module 228 is predicting the labels, it may calculate an inner product (or dot product) of the feature vector and the weight vector so that each individual feature of the feature vector is properly weighted.

The feature vector may include one or more feature components that indicate within the feature vector whether a particular gazetteer applies to the particular word. A gazetteer is a dictionary of word types which share some characteristic. Thus the feature vector may indicate whether a word being processed is one of a pre-defined set of words associated with a gazetteer. For example, one gazetteer may include words that are a part of names of people, another gazetteer may include words that are associated with geographic locations, another gazetteer may include words associated with time of day, etc. In another example, a word may be associated with multiple gazetteers. For example, the word "Lincoln" may then trigger an indication in the feature vector that indicates association with gazetteers for (if available) person names, geographic locations, names of Presidents, etc. Particular techniques may be applied incorporate multiple gazetteers into processing including different weighting schemes, etc.

Figure 3:
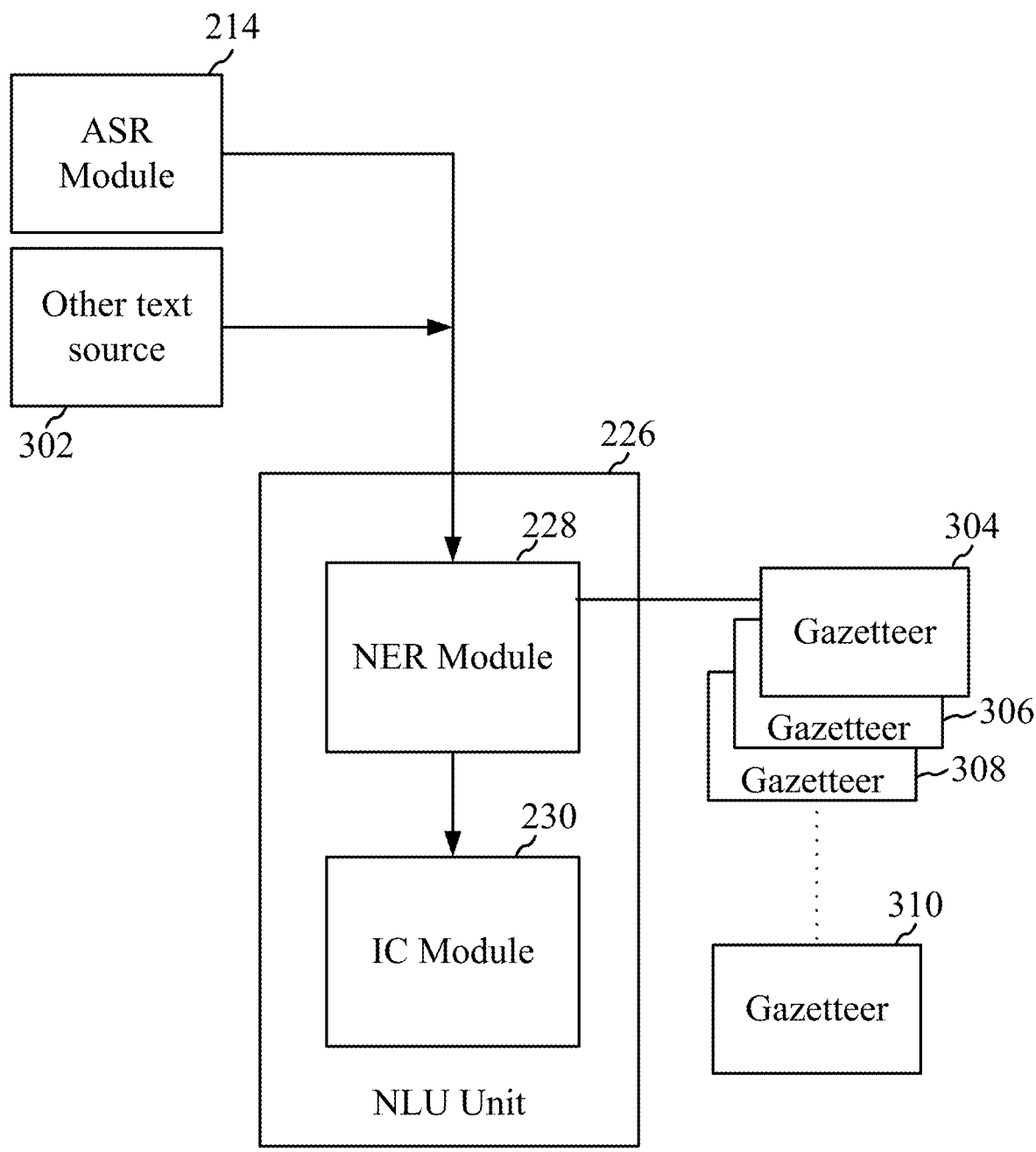
FIG. 3 is a block diagram conceptually illustrating a NLU processor using dynamic gazetteers according to various aspects of the present disclosure.

As illustrated in FIG. 3, speech information, received from an ASR module 214 or other source 302 (e.g., a natural language query received over an audio capture device 204) is received by a NLU unit 226. As part of processing by the NER module 228, particular binary feature vector components may indicate whether a particular gazetteer, e.g. 304, applies for the particular word. One or more gazetteers, 304, 306, 308, 310 may be indicated, via components within the feature vector(s) as applicable in the NLU processing of a particular word. When the NER module 228 knows that a particular gazetteer is associated with a particular word, it may incorporate that information into its processing, thereby increasing the chances that the word may be correctly tagged. For example, if the NER module 228 is processing the word "sting" and its feature vector indicates that the word is associated with names for music artists, the NER module 228 may be more likely to apply the "ArtistName" tag.

The tagged text from the NER module 228 may then be passed to an Intent Classification (IC) module 230 (if appropriate in the particular configuration of the NLU unit 226) or to another module for configuring the tagged text into an appropriate format for ultimate execution by the appropriate application to which the input text command should be directed. The IC module identifies an intent associated with a particular textual input. The intent is a classification that generally represents the command of the textual input. Sample intents may include "PlayMusic," "QueryCalendar," "NewCalendar," "GetDirections," or the like. The IC module 230 may use computing components (such a controller/processor, memory, storage, etc.) associated with the NLU unit 226, with the device 202 generally, or may use computing components specifically associated with the IC module 230. The IC module 230 receives the tagged textual input and compares that input with its known models to determine the intent to associate with a particular text input. For each section of input text (such as a sentence) the IC module 230 may determine a list of potential intents to associate with the text, where each potential intent has an associated score representing the likelihood that a particular intent should be chosen. The intent with the highest score may be chosen and output by the IC module 230, or the IC module 230 may output an N-best list of potential intents and associated commands as interpreted by the NLU unit 226 and/or their respective scores. That output may then be sent to another component of the device (such as another application like a music player, or an intermediate component such as a dialog manager) or other device entirely for execution of the command that was spoken by the user.

In certain circumstances, it may be desirable to provide the NLU unit 226, and the NER module 228 in particular, with information that is tailored to the user of the device in order to provide more accurate results. As an example, a user may be instructing a device to play music from a certain artist. The ASR processing may correctly process the words being spoken by the user (for example, "Play The Who") but the NLU processing to label the words and execute the user command may incorrectly process the words due to some confusion with the artist's name or otherwise being unable to perform the precise task desired by the user. If the NER module 228 were aware that "the Who" is an artist that appears in the user's music catalog, it may be more able to correctly process the input text. According to the disclosure, it is possible to flexibly extend the feature vectors of the words for NLU processing, and thereby enhance NLU processing and speech recognition results, by attaching one or more customized gazetteers through feature vectors incorporated during NLU processing.

One or more gazetteers may be customized based on a user of a device. For example, gazetteers such as "user artist names," "user playlist names," "user contact names," "frequent user locations," etc. may be created and populated with words associated with the user. The feature vector definitions as used by the NER module 228 may then be adjusted to account for these new user information gazetteers. When a word is encountered by the NLU unit 226 which includes a word associated with a particular user information gazetteer, the appropriate entry in the feature vector is activated, thus identifying to the NER module 228 that the specific user-information gazetteer applies to the associated word. Thus the NER module 228 may more accurately tailor its processing to information relevant to the user of the device.

Figure 4:
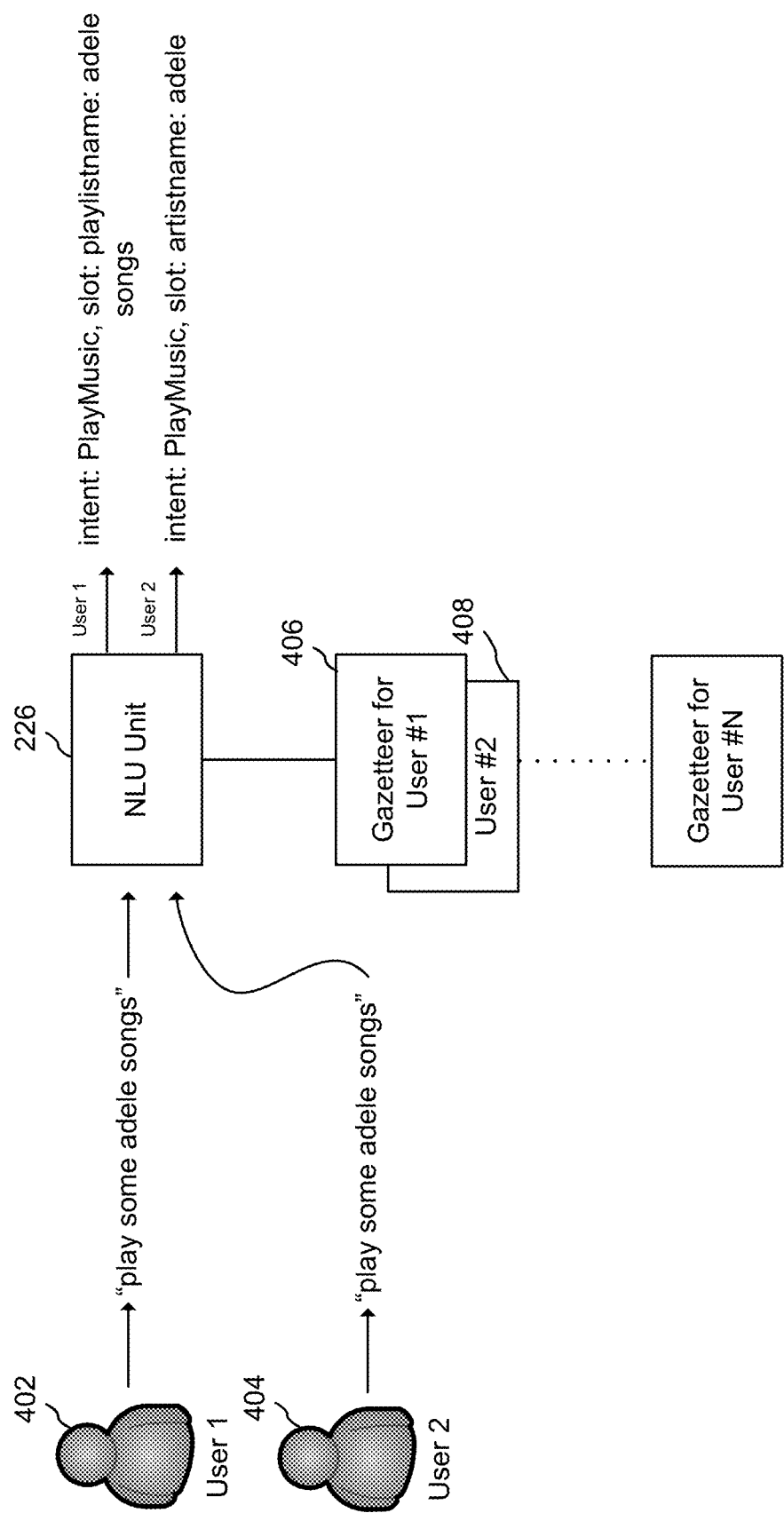
FIG. 4 is a further block diagram of a speech processing system with personalized entity recognition information implemented in a gazetteer available to a Natural Language Understanding (NLU) unit according to one aspect of the present disclosure.

An example of NER incorporating gazetteers for user specific information is illustrated in FIG. 4. A spoken utterance is processed by an ASR module, which outputs the text "play some adele songs." The NLU unit 226 may determine that a user intended to activate a streaming music application and play an Adele song when in fact this user had intended to play a playlist entitled "Adele songs." In this and other circumstances, the text of the utterance alone does not assist in disambiguating the intent and action from the utterance.

To assist in processing, the NLU unit 226 may be configured to access a specific user's personal entity recognition information, stored as a gazetteer 406 and incorporate the user information into a model at run time, which allows decoding of different semantic interpretations from the same utterance for different users (or better decoding of semantic interpretation for a given user), based on the user's specific information. For example, as illustrated in FIG. 4, if User #1 and User #2, 402 and 404 respectively, both introduce the same utterance, "play some adele songs," into the device the NLU unit 226, may be configured to access each specific user's entity recognition information, such as gazetteer 406 for User #1 and gazetteer 408 for User #2. These gazetteers may include information such as a user's recent behavior with a device (e.g., playing a specific song), a user's data stored on the device (e.g., a playlist called "Adele songs") or other information. Incorporation of the user information at run time allows preparing different semantic interpretations for the same utterance, based on the user's information. For example, the NLU unit 226 may interpret the utterance as intent: Playmusic, slot: playlistname: adele songs for User #1 (for example, leading to an action to play User #1's playlist entitled "Adele songs"). For User #2 the very same utterance may be interpreted as intent: Playmusic, slot: artistname: adele (for example, leading to an action to play songs by Adele organized by artist name).

Binary features may be implemented in feature vectors indicating that a certain word is or is not associated with one or more gazetteers. Accordingly, while the feature vector may be large and include many indicated features, each feature is weighted by the corresponding NER model parameters so that each feature is properly accounted for during NER processing. Further, the feature vector may be associated with one or more gazetteers that may make more information available to enhance entity recognition. As user specific information may not be known at the time NER models are training, a general gazetteer may be used to train NER models. A user specific gazetteer may then be used at run time in place of the general gazetteer to enable the customized NER processing.

Figure 5:
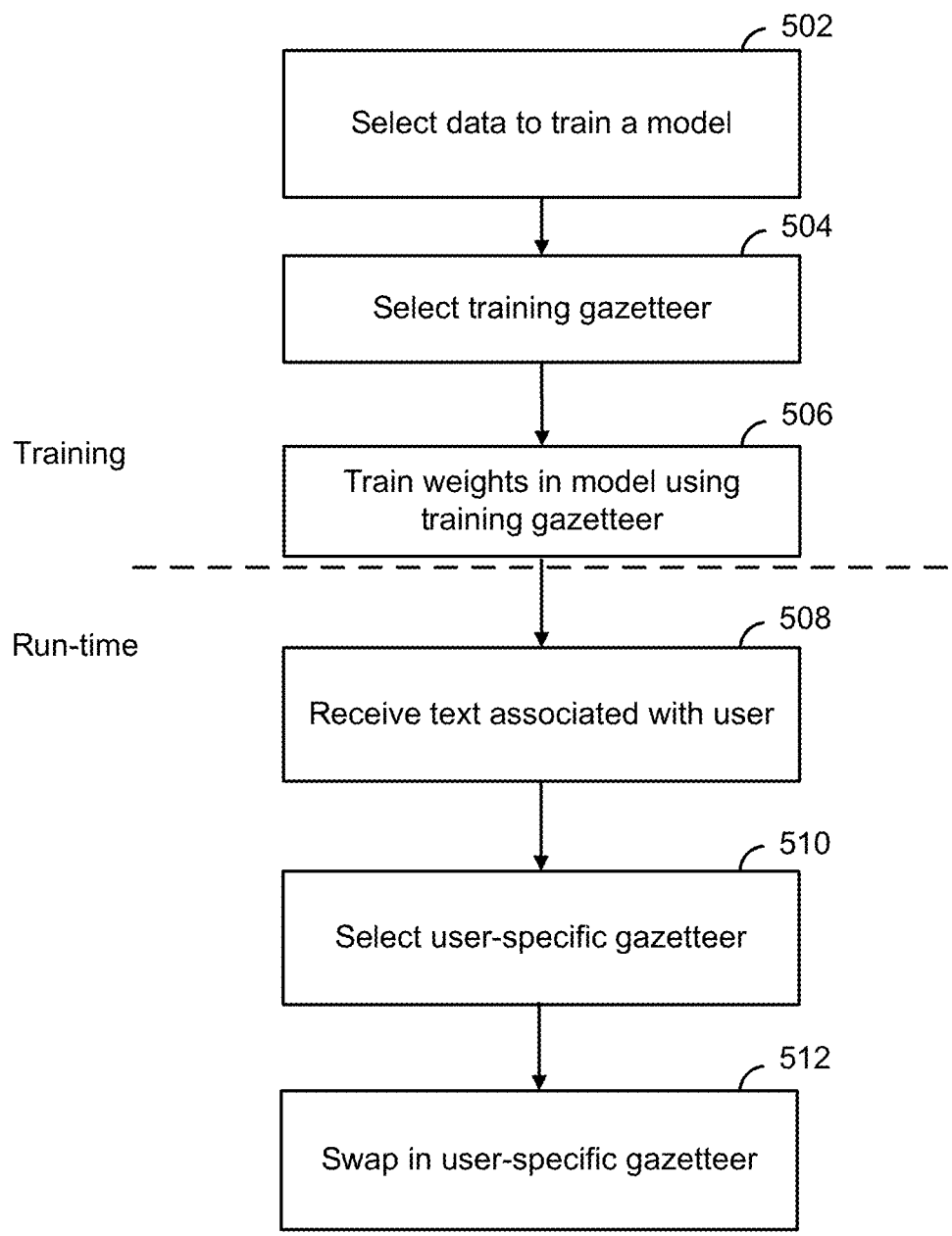
FIG. 5 is a flow diagram conceptually illustrating a method of factoring dynamic gazetteers for training and decoding according to one aspect of the present disclosure.

In one implementation, illustrated in FIG. 5, a method of factoring dynamic gazetteers for training and decoding according to the disclosure is illustrated. FIG. 5 is divided into two sections, the training section represented by boxes 502-506, and the runtime section boxes 508-512. In this implementation, at box 502, data is selected to train an NER with associated feature vectors. In the training step, a general training gazetteer is selected, as in box 504, for use in training. The training gazetteer may be, for example, a large catalog of artist names and songs that may appear in a user music catalog. Selection of data and selection of a training gazetteer may happen separately. The training gazetteer is used to train the weights in the model, as in box 506. This training gazetteer may be the same one used to train NER models as used by a variety of user devices (i.e., may be the same for every user). At run-time, when the trained NER model is used for actually decoding queries in the NLU processing for a particular user, an NER module 228 may receive text associated with a user, as shown in box 508. Then a user-specific gazetteer is selected, as in box 510, and that user-specific gazetteer is swapped in, as shown in box 512. For example, a user-specific music catalog may be swapped in including user preference information and other personalized information to enhance decoding during NLU processing. Thus, if the word being processed appears in the user-specific gazetteer (as opposed to the general training gazetteer), the particular feature vector entry associated with the gazetteer category is activated, allowing the NER module 228 to adjust its processing accordingly.

In this manner, the statistical model may be trained to be aware of these items as a result of the training gazetteer even if the data that was used to train the model was not large and is different from the user-specific gazetteer information. This implementation facilitates personalizing models on the fly, without necessarily retraining them, by changing the gazetteer used at run time. As one example, such an implementation may be applied in a case where a music player service is provided to a number of users and they have different lists of songs on their music accounts. It would be beneficial to have a high quality of natural language understanding service for each particular user. The described use of gazetteers provides this customized service. Accordingly it is possible to personalize the model with the user information provided with the user-specific gazetteers.

Figure 6:
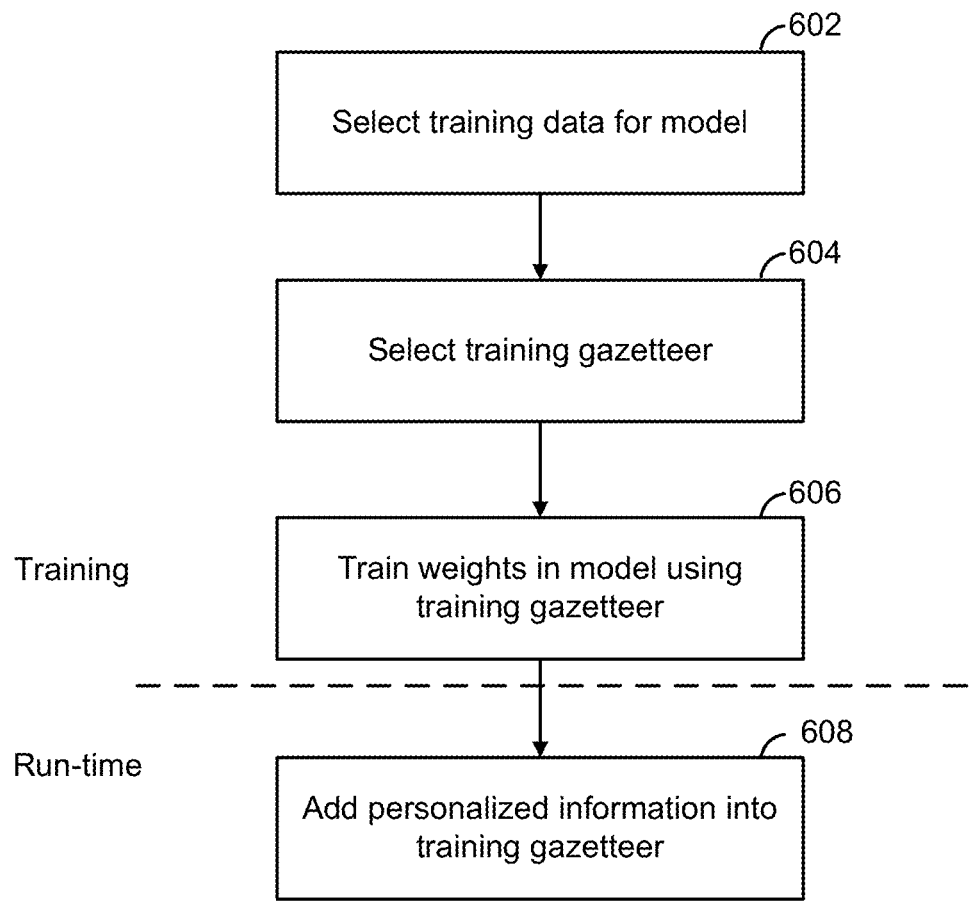
FIG. 6 is a flow diagram conceptually illustrating a method of implementing dynamic incremental gazetteers according to a further aspect of the present disclosure.

In a further aspect according to the disclosure, rather than switching the gazetteer completely at run time, it is possible to incrementally add updated personal content to the original content on which the NER model was trained at run time. A flow diagram conceptually illustrating a method of implementing dynamic incremental gazetteers according to a further aspect of the present disclosure is shown in FIG. 6. FIG. 6 is divided into two sections, the training section represented by boxes 602-606, and the runtime box 608. In this implementation, at box 602, a model is selected for developing training data with associated feature vectors. Again, in the training step a general training gazetteer is selected, as in box 604, for use in training. The training gazetteer may be, for example, a large catalog of artist names and songs, with no preference or personalized information. This training gazetteer is used to train the weights in the model, as in box 606. This training gazetteer may be static across users (i.e. is the same for every user). However, the training gazetteer may be incrementally customized by adding user-specific information into the same gazetteer used to train the model, as in box 608. Thus instead of creating a new gazetteer that is entirely specific to a user, an existing gazetteer may be incrementally adjusted for use by the NER module 228. The user-specific information may include information that is in the same category of the training gazetteer, only specifically related to the user. For example, the user-specific information may indicate which songs a user has purchased and therefore is likely to request for playback.

Figure 7:
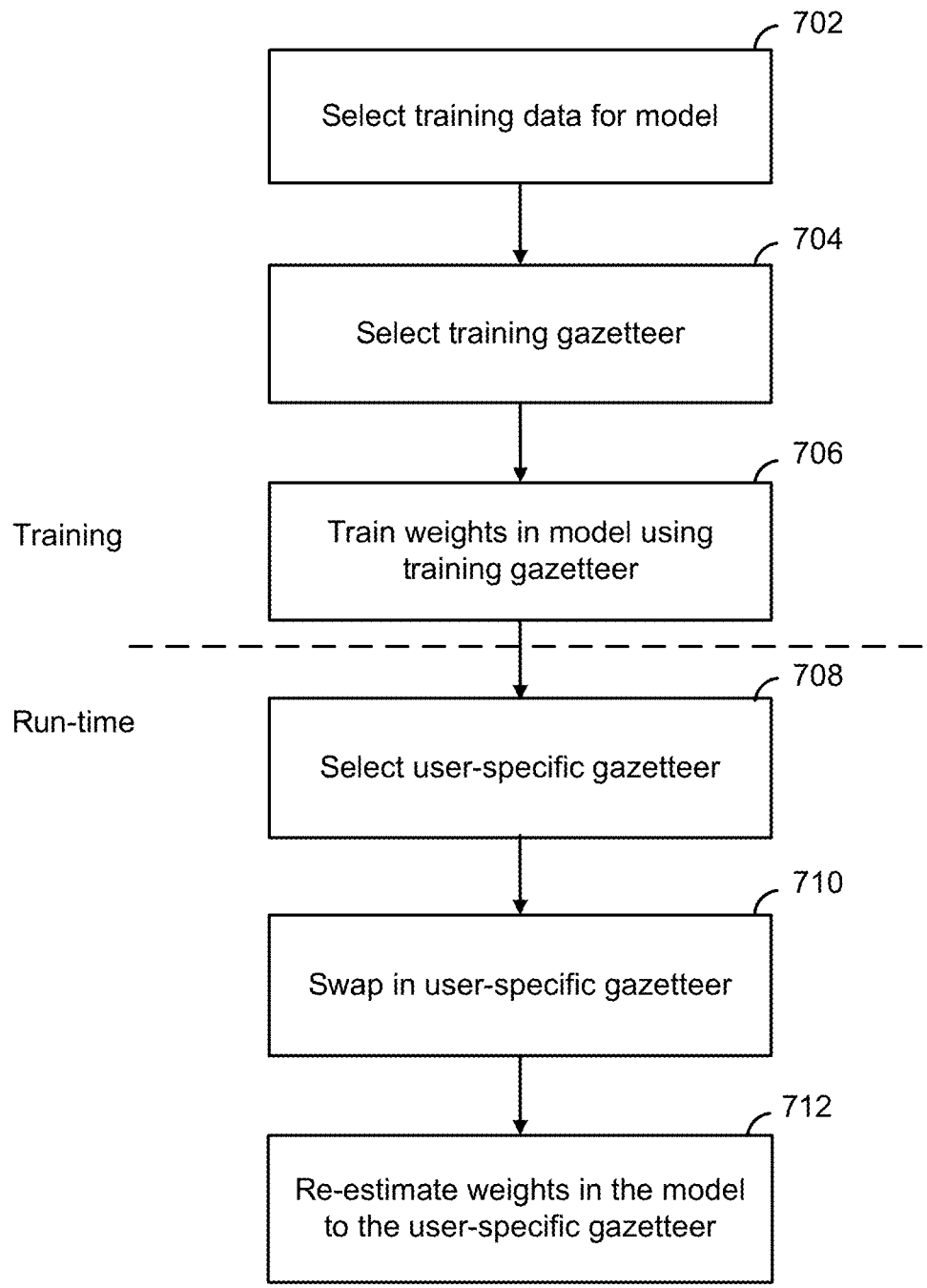
FIG. 7 is a flow diagram conceptually illustrating a method of implementing dynamic gazetteers according to a further aspect of the present disclosure.

FIG. 7 shows a still further implementation according to the disclosure. FIG. 7 is divided into two sections, the training section represented by boxes 702-706, and the runtime section boxes 708-712. As with the implementation illustrated in FIG. 5, training data is selected for the model 702. A general training gazetteer is selected, as in box 704, for use in training. The training gazetteer may be, for example, a large catalog of artist names and songs, with no preference or personalized information. This training gazetteer is used to train the weights in the model, as in box 706. This training gazetteer is static across users (i.e. is the same for every user). Then, when the model is used for actually decoding queries in the NLU processing for a particular user, a user-specific gazetteer is selected, as in box 708, and that user-specific gazetteer is swapped in at run time 710. Further, as in box 712, the weights used by the NER module 228 may be re-estimated to the user-specific gazetteer. Re-weighting may occur periodically rather than with each processing pass. One potential way of re-estimating model weights is to first collect multiple sentences from the particular user in an actually deployed system and when sufficient number of such sentences is available repeat the training process 706 on the user specific data. One technique for re-estimating weights is described in U.S. Pat. No. 9,190,055, with the title "Named Entity Recognition with Personalized Models," filed on Mar. 14, 2013, in the names of Imre Kiss, Lambert Mathias, and Jeffrey Adams, the disclosure of which is incorporated by reference in its entirety. This re-weighting may be configured to more heavily weight the personalized information over the generalized information.

As discussed herein, personalized data may be used to build gazetteers available to the NLU processor to enhance NLU processing. Personalized data may include user specific information, such as the identity of the user and/or the device, which may include the identity of the specific user or the identity of known users of the particular device from which the textual input originated. The identity of the user may be determined by performing a speaker identification operation, receiving an identity of the user, receiving an identity of the user device, or though other methods. The identity information may be linked to other information such as user operational history, that is information regarding the user's previous interactions with the device including previous commands received from the user. For example, if a particular user regularly asks a device to play music from a group of three musical artists, that information may be provided in a gazetteer to inform the overall NLU processing. The user information may be even more specific. For example, if a particular user regularly asks to listen to music from a specific artist during the morning hours and a different artist during the evening hours, that information may also be included in a personalized user-specific gazetteer. Other user data may include the content of a user's music catalog, a device's available applications, a user's calendar entries and/or contacts, and the like. The user data may be specific to a particular user or may be aggregated with data from other users, which may also be useful, such as knowing that a large population of users in a certain geographic location are querying devices for weather information.

User-personalized data may also include physical context information such as user/device location (such as geographic location or location category (work v. home, etc.)), time of day, calendar information (including date, season, time of year, etc.), weather data, device type (phone v. television, etc.), and the like. This information may be correlated to user specific data to inform NLU processing, such as knowing that a particular user regularly asks to listen to Christmas music during the later months of the year, but only when the weather is cold. Still other user-personalized data may include the volume of the user's speech input, the speed of the user's speech input, the relative noise surrounding the user, and other physical context information which may be used to determine a particular context that may inform NLU processing (such as a user emergency, a user in a social situation, etc.). Many other variations of non-textual user-personalized data may also be considered as part of a user-specific gazetteer for use in NLU processing.

Figure 8:
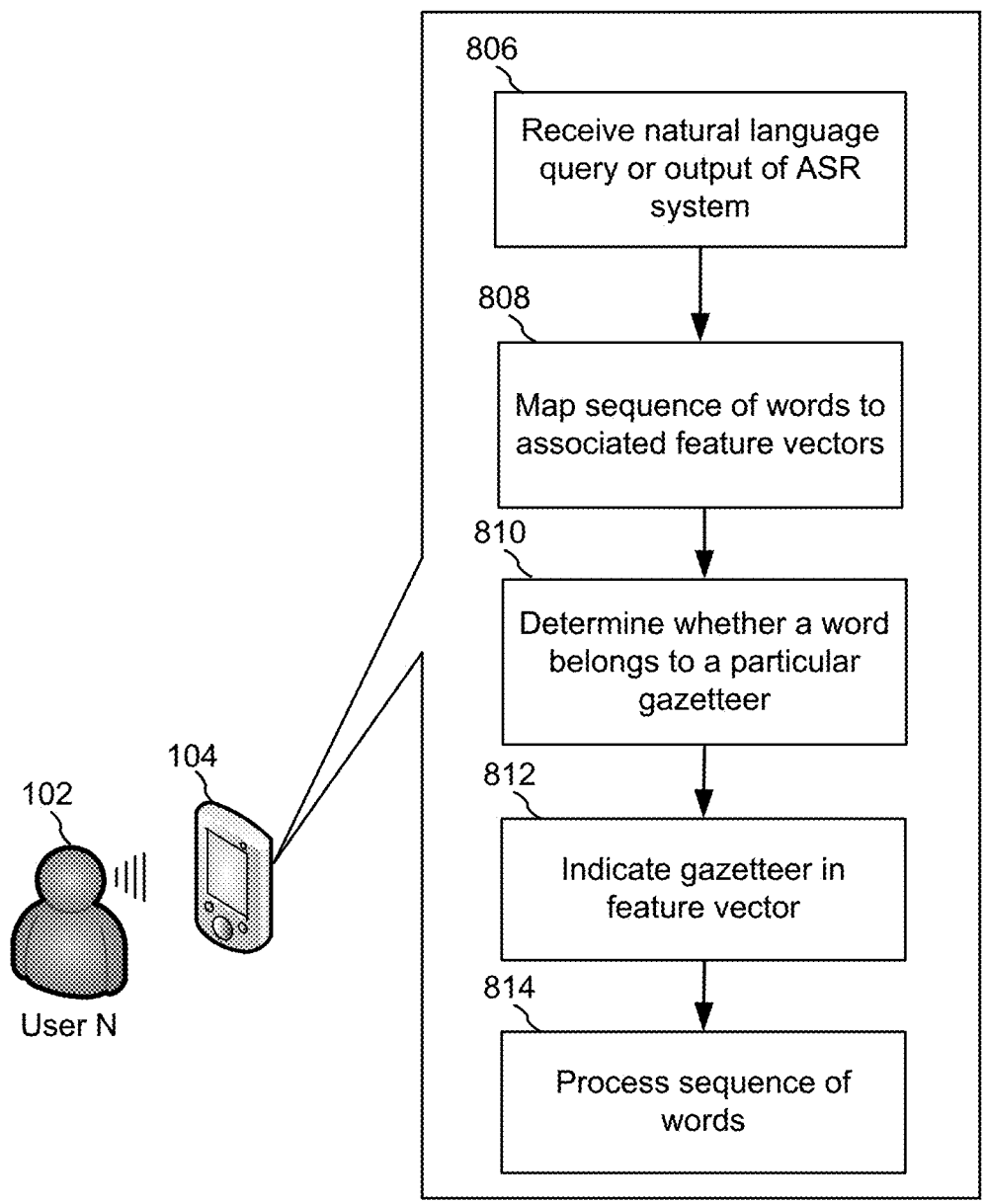
FIG. 8 is a flow diagram conceptually illustrating a device for speech processing implementing personalized entity recognition information according to one aspect of the present disclosure.

As illustrated in FIG. 8, speech processing implementing user-specific entity recognition information according to one aspect of the present disclosure involves receiving as input to the NLU unit 226 a natural language query or output of an ASR system, as at box 806. The input words are then mapped to feature vectors indicating what features are applicable to each word, as at box 808. As part of that mapping, a determination is made as to whether a word is associated with one or more gazetteers, as at box 810. If the word is associated with a gazetteer, that association is indicated in the feature vector associated with the word, as at box 812. The NER module 228 may then process the words of the text and to apply tags based on the feature vectors and indicated applicable gazetteers, as at box 814.

Figure 9:
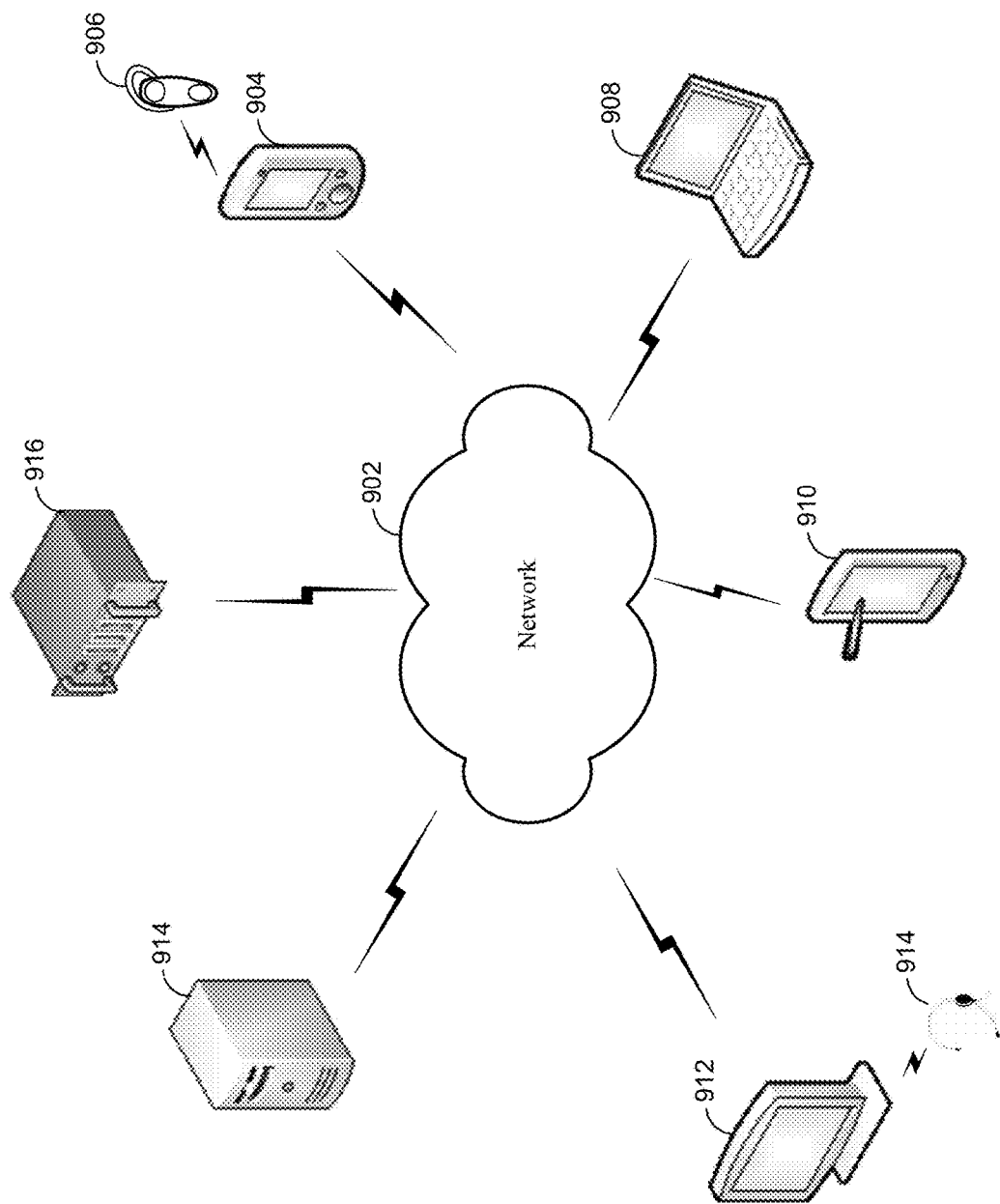
FIG. 9 illustrates a computer network for use with distributed speech processing according to one aspect of the present disclosure.

As shown in FIG. 9, multiple devices may be connected over a network 902. Network 902 may include a local or private network or may include a wide network such as the internet. Devices may be connected to the network 902 through either wired or wireless connections. For example, a wireless device 904 may be connected to the network 902 through a wireless service provider. Other devices, such as computer 912, may connect to the network 902 through a wired connection. Other devices, such as laptop 908 or tablet computer 910 may be capable of connection to the network 902 using various connection methods including through a wireless service provider, over a WiFi connection, or the like. Networked devices may input spoken audio through a number of audio input devices including through headsets 906 or 914. Audio input devices may be connected to networked devices either through a wired or wireless connection. Networked devices may also include embedded audio input devices, such as an internal microphone (not pictured) in laptop 908, wireless device 904 or table computer 910.

In certain speech processing system configurations, one device may capture an audio signal and other device(s) may perform the speech processing. For example, audio input to the headset 914 may be captured by computer 912 and sent over the network 902 to computer 914 or server 916 for processing. Or computer 912 may partially process the audio signal before sending it over the network 902. In another aspect, the speech capture, ASR, and NLU processing may all be performed on different devices. Because speech processing may involve significant computational resources, in terms of both storage and processing power, such split configurations may be employed where the device capturing the audio has lower processing capabilities than a remote device and higher quality results are desired. The audio capture may occur near a user and the captured audio signal sent to another device for processing.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. For example, the speech recognition techniques described herein may be applied to many different languages, based on the language information stored in the speech storage.

Aspects of the present disclosure may be implemented as a computer implemented method, a system, or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid state memory, flash drive, removable disk, and/or other media.

Aspects of the present disclosure may be performed in different forms of software, firmware, and/or hardware. Further, the teachings of the disclosure may be performed by an application specific integrated circuit (ASIC), field programmable gate array (FPGA), or other component, for example.

Aspects of the present disclosure may be performed on a single device or may be performed on multiple devices. For example, program modules including one or more components described herein may be located in different devices and may each perform one or more aspects of the present disclosure. As used in this disclosure, the term "a" or "one" may include one or more items unless specifically stated otherwise. Further, the phrase "based on" is intended to mean "based at least in part on" unless specifically stated otherwise. The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer implemented method, comprising:
   obtaining a textual representation of a user request, the user request associated with user identification data;
   obtaining first user specific data associated with the user identification data;
   creating a first feature vector corresponding to the textual representation, the first feature vector including a first feature value and a second feature value, the first feature value indicating that a first word of the textual representation is represented in the first user specific data, the second feature value indicating that a second word of the textual representation is not represented in the first user specific data;
   determining, based at least in part on the first feature vector, first classification data indicating a first classification associated with one or more words included in the textual representation;
   using the textual representation and the first classification data to determine intent data; and
   sending the intent data to a component to execute a command associated with the intent data.

2. The computer-implemented method of claim 1, further comprising:
   determining the user identification data by at least one of:
      performing a speaker identification operation on audio data corresponding to the user request; or
      processing a device identifier corresponding to the user request to determine the user identification data.

3. The computer-implemented method of claim 1, wherein:
   determining the first classification data further comprises determining, based at least in part on the first feature vector and a named entity recognition model, the first classification;
   the named entity recognition model is trained for general use; and
   the first user specific data comprises a gazetteer corresponding to the user identification data.

4. The computer-implemented method of claim 1, wherein:
   determining the first classification data further comprises determining, based at least in part on the first feature vector and a named entity recognition model, the first classification; and the first user specific data comprises a gazetteer with a first portion configured for general use and a second portion including information specific to the user identification data.

5. The computer-implemented method of claim 1, wherein creating the first feature vector further comprises:
   determining that the first word is included in the textual representation;
   determining that the first word is represented in the first user specific data;
   setting the first feature value of the first feature vector equal to a first value, the first value indicating that the first word is represented in the first user specific data;
   determining that the second word is included in the textual representation;
   determining that the second word is not represented in the first user specific data; and
   setting the second feature value of the first feature vector equal to a second value, the second value indicating that the second word is not represented in the first user specific data.

6. The computer-implemented method of claim 1, wherein determining the first classification data further comprises:
   determining, based at least in part on the first feature vector and a named entity recognition model, the first classification corresponding to the first word;
   generating a first label associated with the first word, the first label indicating the first classification;
   determining, based at least in part on the first feature vector and the named entity recognition model, a second classification corresponding to a third word of the textual representation;
   generating a second label associated with the third word, the second label indicating the second classification; and
   determining the first classification data, the first classification data including the first label and the second label.

7. The computer-implemented method of claim 1, wherein obtaining the textual representation further comprises:
   receiving, from a device, audio data that includes a representation of the user request;
   determining, based on at least one of an identity of the device or the audio data, the user identification data; and
   performing speech processing on the audio data to generate the textual representation.

8. The computer-implemented method of claim 1, wherein using the textual representation and the first classification data to determine the intent data further comprises:
   determining, using a first label included in the first classification data, that the first word is associated with the first classification, the first classification indicating that the first word corresponds to a command indicated by the user request;
   determining, using a second label included in the first classification data, that a third word of the textual representation is associated with a second classification, the second classification indicating that the third word is a target of the command;
   determining the component associated with the command; and
   determining the intent data, the intent data indicating the command to be executed and additional information required to execute the command.

9. The computer-implemented method of claim 1, further comprising:
   obtaining second user specific data associated with the user identification data;
   creating a second feature vector corresponding to the textual representation, the second feature vector including a third feature value indicating that a third word of the textual representation is represented in the second user specific data; and
   determining, based at least in part on the first feature vector and the second feature vector, the first classification data,
   wherein the first user specific data corresponds to a first list of words that are associated with names represented in a music catalog associated with the user identification data, and the second user specific data corresponds to a second list of words that are associated with locations associated with the user identification data.

10. A computer implemented method, comprising:
    obtaining a textual representation of a user request, the user request associated with a device;
    obtaining first device specific data associated with the device;
    creating a first feature vector corresponding to the textual representation, the first feature vector including a first feature value and a second feature value, the first feature value indicating that a first word of the textual representation is represented in the first device specific data, the second feature value indicating that a second word of the textual representation is not represented in the first device specific data;
    determining, based at least in part on the first feature vector, first classification data indicating a first classification associated with one or more words included in the textual representation;
    using the textual representation and the first classification data to determine intent data; and
    sending the intent data to a component to execute a command associated with the intent data.

11. The computer-implemented method of claim 10, further comprising:
    determining a device identifier corresponding to the device;
    determining device profile data corresponding to the device identifier; and
    identifying, using the device profile data, the first device specific data.

12. The computer-implemented method of claim 10, wherein:
    determining the first classification data further comprises determining, based at least in part on the first feature vector and a named entity recognition model, the first classification;
    the named entity recognition model is trained for general use; and
    the first device specific data comprises a gazetteer corresponding to the device.

13. The computer-implemented method of claim 10, wherein:
    determining the first classification data further comprises determining, based at least in part on the first feature vector and a named entity recognition model, the first classification;
    the first device specific data comprises a gazetteer with a first portion configured for general use and a second portion including information specific to the device.

14. The computer-implemented method of claim 10, wherein creating the first feature vector further comprises:
 determining that the first word is included in the textual representation;
 determining that the first word is represented in the first device specific data;
 setting the first feature value of the first feature vector equal to a first value, the first value indicating that the first word is represented in the first device specific data;
 determining that the second word is included in the textual representation;
 determining that the second word is not represented in the first device specific data; and
 setting the second feature value of the first feature vector equal to a second value, the second value indicating that the second word is not represented in the first device specific data.

15. The computer-implemented method of claim 10, wherein determining the first classification data further comprises:
 determining, based at least in part on the first feature vector and a named entity recognition model, the first classification corresponding to the first word;
 generating a first label associated with the first word, the first label indicating the first classification;
 determining, based at least in part on the first feature vector and the named entity recognition model, a second classification corresponding to a third word of the textual representation;
 generating a second label associated with the third word, the second label indicating the second classification; and
 determining the first classification data, the first classification data including the first label and the second label.

16. The computer-implemented method of claim 10, further comprising:
 obtaining second device specific data associated with the device;
 creating a second feature vector corresponding to the textual representation, the second feature vector including a third feature value indicating that a third word of the textual representation is represented in the second device specific data; and
 determining, based at least in part on the first feature vector and the second feature vector, the first classification data,
 wherein the first device specific data corresponds to a first list of words that are associated with names represented in a music catalog associated with the device, and the second device specific data corresponds to a second list of words that are associated with locations associated with the device.

17. A computer implemented method, comprising:
 obtaining a textual representation of a user request;
 obtaining location data associated with the user request;
 creating a first feature vector corresponding to the textual representation, the first feature vector including a first feature value and a second feature value, the first feature value indicating that a first word of the textual representation is represented in the location data, the second feature value indicating that a second word of the textual representation is not represented in the location data;
 determining, based at least in part on the first feature vector, first classification data indicating a first classification associated with one or more words included in the textual representation;
 using the textual representation and the first classification data to determine intent data; and
 sending the intent data to a component to execute a command associated with the intent data.

18. The computer-implemented method of claim 17, wherein obtaining the location data further comprises:
 determining that the user request originated at a first device during a first time period;
 determining a geographic location corresponding to the user request, the determining further comprising at least one of:
  determining an address associated with the first device,
  receiving first global positioning system (GPS) data corresponding to the user request, the first GPS data indicating a first location of the first device during the first time period, or
  receiving second GPS data corresponding to a second device associated with the first device, the second GPS data indicating a second location of the second device during the first time period; and
 determining the location data using the geographic location, wherein the location data corresponds to a list of words corresponding to a population of users associated with the geographic location.

19. The computer-implemented method of claim 17, wherein:
 determining the first classification data further comprises determining, based at least in part on the first feature vector and a named entity recognition model, the first classification;
 the named entity recognition model is trained for general use; and
 the location data comprises a gazetteer associated with a geographic location.

20. The computer-implemented method of claim 17, wherein:
 determining the first classification data further comprises determining, based at least in part on the first feature vector and a named entity recognition model, the first classification; and
 the location data comprises a gazetteer with a first portion configured for general use and a second portion including information specific to a geographic location.

21. The computer-implemented method of claim 10, wherein the first feature value represents a first binary value and a third feature value of the first feature vector represents a second binary value indicating that the first word is not represented in second device specific data.

22. The computer-implemented method of claim 10, further comprising:
 obtaining second device specific data associated with the device;
 determining that the first word is represented in the second device specific data; and
 determining a third feature value of the first feature vector, the third feature value indicating that the first word is represented in the second device specific data.

23. The computer-implemented method of claim 10, further comprising:
 obtaining second device specific data associated with the device;
 determining that the second word is represented in the second device specific data; and determining a third feature value of the first feature vector, the third feature value indicating that the second word is represented in the second device specific data.

\* \* \* \* \*